July 9, 1935.  E. D. BROWN  2,007,593
AUTOMOBILE BRAKE
Filed May 1, 1934   2 Sheets-Sheet 1

Inventor
Edgar D. Brown
By Cameron, Kerkam & Sutton
Attorneys

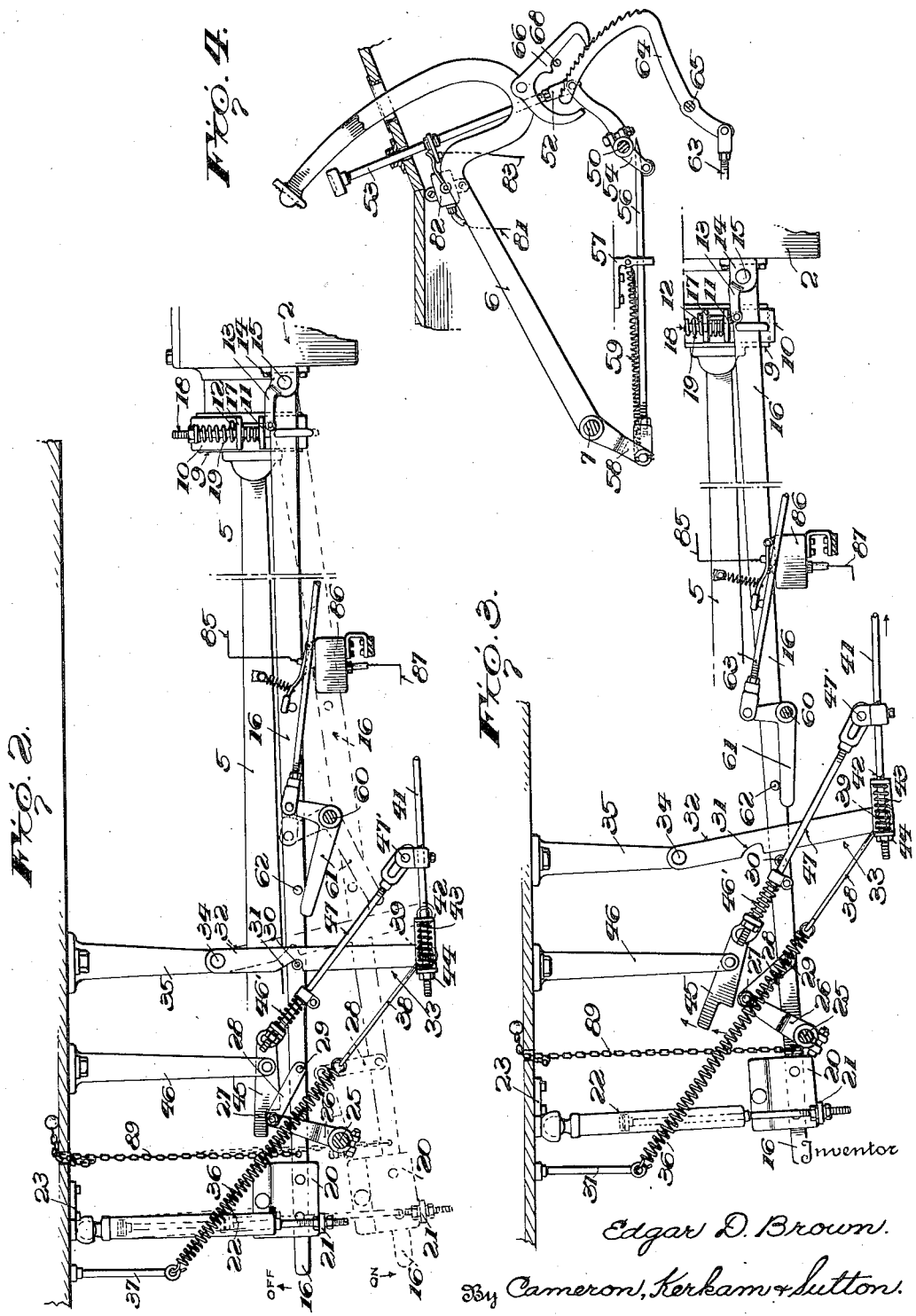

Patented July 9, 1935

2,007,593

UNITED STATES PATENT OFFICE 2,007,593

AUTOMOBILE BRAKE

Edgar D. Brown, Pottsville, Pa.

Application May 1, 1934, Serial No. 723,396

8 Claims. (Cl. 192—13)

This invention relates to brake mechanism for automotive vehicles and the like and more particularly to a power actuated emergency or parking brake which may be applied without the necessity of the manipulation of an emergency brake hand lever by the operator, and of the type generally disclosed in my prior Patents Nos. 1,645,124 and 1,645,125 on which this is an improvement.

One of the objects of this invention is to provide a power actuated emergency brake that will remain in the applied position after it has been applied until released by the return of the clutch lever on engagement of the clutch, thereby eliminating any but the desired movement of the car on an incline or hill.

A further object of this invention is to provide an electric circuit and electric lock in conjunction with the ordinary ignition lock of the vehicle which will render the brake releasing means inoperative when the ignition system of the vehicle is broken or in the off position, thus eliminating any accidental release of the brake by play of children or other hazard.

Another and still further object of this invention is to provide a device that will return the brake to the released position automatically should the brake be accidentally applied by reason of faulty construction and will retain the brake in the released position in this emergency until the operator of the vehicle desires to apply it.

Another object of this invention is to provide a power braking means that may only be released at a predetermined position of the service or foot brake and by means of an additional releasing device independent of either the clutch or the service brake, thus eliminating any opportunity for release of the brake other than at the will of the operator.

A further object of this invention is to provide a means for releasing the brake controlled by an electric circuit so designed as to be broken or open when the brake is being applied, thus eliminating any chance of the releasing means counteracting the application of the brake, and designed to remain open when the brake is applied until the ignition lock is turned to the on position and the clutch lever is returned to engaged position.

Other and still further objects of the invention will appear in the following description.

The invention is capable of application in many mechanical forms, one of which is shown in the accompanying drawings for the purpose of illustrating the invention, but it is to be expressly understood that the invention is not limited by this illustrative embodiment nor are these drawings designed to define the scope of the invention, reference being had to the appended claims for this purpose.

In said drawings—

Fig. 2 is a side view of a portion of the embodiment shown in Fig. 1 showing in full line the brake in released position and in dotted line the position of the parts when the brake is applied;

Fig. 3 is a side elevation similar to Fig. 2 showing the parts at the position they occupy just after the weighted lever has been released and the brake is going on; and Fig. 4 is a more detailed side elevation of the releasing stud and switch actuated by said stud and of the foot brake lever safety device, all of which are shown in their operative positions in Fig. 1.

Figure 1:
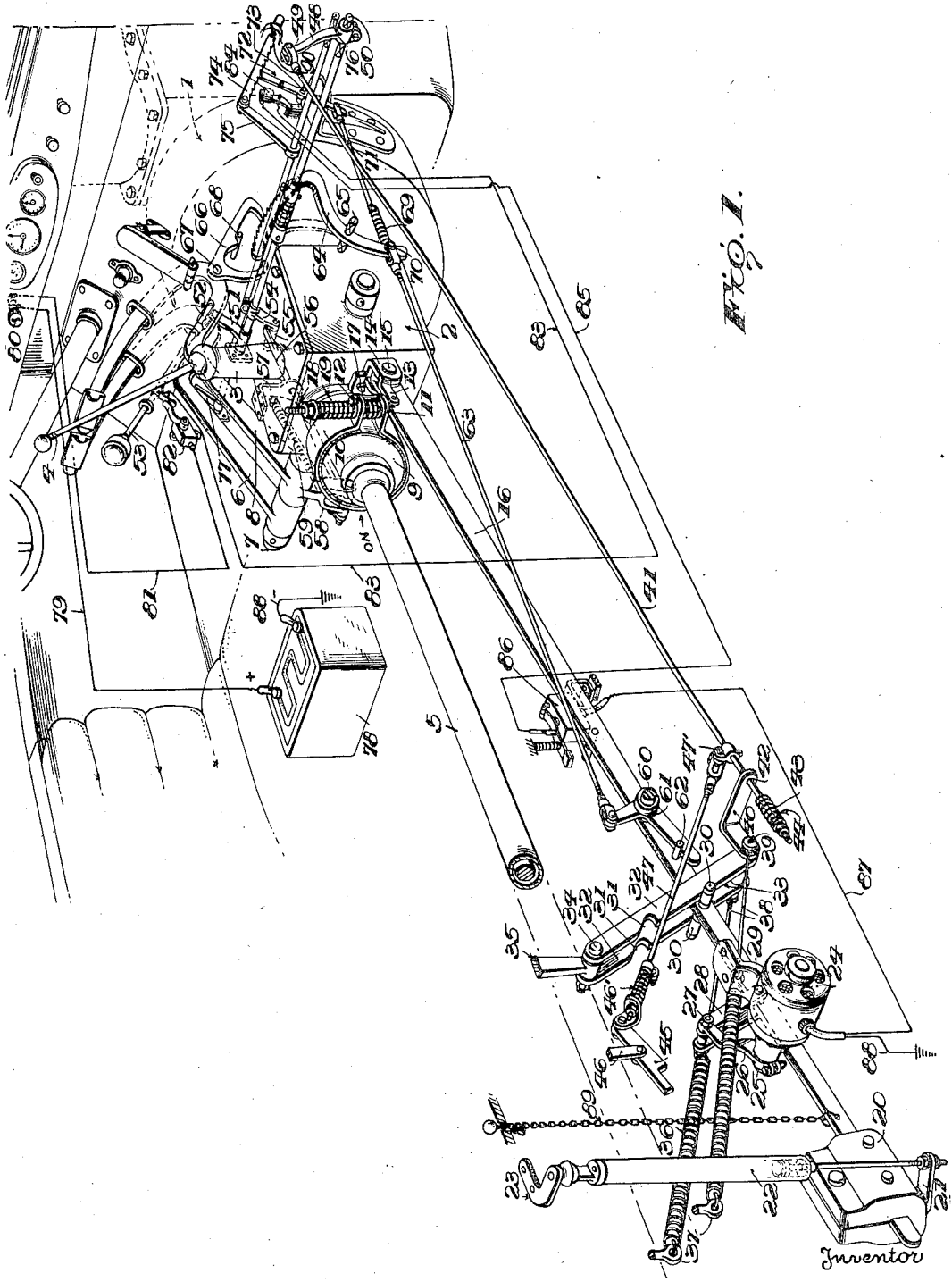
Fig. 1 is a perspective elevation of a portion of mechanism of an automobile showing one embodiment of the invention applied thereto with the emergency brake in the applied position.

Referring to the drawings, in which like reference numerals indicate like parts throughout the several views, in Fig. 1, 1 is the flywheel casing, 2 the gear box, 3 the shift lever base for shift lever 4, 5 is the drive shaft, 6 is the clutch lever rotatably mounted on shaft 7, 8 is the foot brake lever also rotatably mounted on shaft 7, all of which may be of any standard construction. Referring now as well to Fig. 2 and Fig. 3, formed on drive shaft 5 is brake drum 9 adjacent to gear box 2. Brake band 10 is positioned around said brake drum 9 with its lower end 11 attached by pin 12 to arm 13 of bracket 14 attached to the gear box 2. Rotatably mounted in bracket 14 on pin 15 is a rearwardly extending, brake applying lever 16 which applies a braking pressure to the upper end 17 of brake band 10 through pin 18 and spring 19, pin 12 passing through end 17 and acting as guide for it. Adjustably mounted on lever 16 is weight 20 to which is attached by bracket 21 suitable shock absorbing means 22, fastened at 23 to the car frame, said means being designed to take up the shock of the fall of weight 20 and lever 16. Attached to the car frame at any suitable point is an electric motor 24 whose armature 25 carries an arm 26 to which is rotatably mounted at 27 a connecting link 28 which connects to the lever 16 at pivot 29. Formed on the lever 16 are the lugs 30 designed to engage the notches 31 cut in the sides 32 of the latch 33 when the brake is in the released position. Latch 33 is rotatably mounted at 34 to any suitable member 35 attached to the car frame. Springs 36 fastened at 37 to the car frame, and acting through rods 38 connected to latch 33 by pin 39, maintain engagement between sides 32 and lugs 30 to insure engagement of lugs 30 with notches 31 when the lever 16 is raised. To latch 33 is fastened by pin 39 a bracket 40 through which passes latch releasing rod 41 at 42. Rod 41 engages bracket 40 through spring 43 and stop nut 44.

Safety latch 45 is rotatably mounted on projection 46 so as to engage pivot 27 when the lever 16 is in the raised position, said latch being connected to rod 41 by rod 47 through suitable joints 46' and 47'. At its forward end rod 41 engages crank arm 48 at pivot 49, crank arm 48 being firmly secured to shaft 50 rotatably mounted at its outer end to the car frame and at its inner end to the shift lever base 3. Adjacent to shift lever base 3 and secured to shaft 50 is arm 51 connected at its outer end through connection 52 to the trip stud 53. Also secured to shaft 50 is arm 54 carrying at its other end and at right angles thereto member 55. Over member 55 passes safety rod 56 guided by frame 57 secured to the car frame and actuated by brake lever 8 through connection 58. Spring 59 insures the return of the brake lever 8 to its normal position.

Attached to lever 16 is stud 60 on which is rotatably mounted bell crank lever 61. Projection 62 on shaft 16 acts as a stop for upward motion of the long arm of the bell crank lever 61, the short arm of said lever being connected by rod 63 to notched rack 64. Rack 64 is rotatably mounted on shaft 65 fastened to the gear box 2, or in any other suitable way, so as to engage the tooth member 66 pivoted at 67 to brake lever 8. The inner side of the tooth member 66 rides on projection 68 mounted on the car frame or other fixed member.

Rod 71 acting through spring 69 and pin 70 joins rack 64 and switch arm 72 mounted to rotate on pin 73. Switch arm 72 is connected to clutch lever 6 through the notched bar 74, arm 75 permanently fastened to shaft 76 rotatably mounted in the car frame and terminating in finger 77 which engages the under surface of the clutch lever 6.

Novel means have been provided to raise the weighted lever 16 and release the brake when it is desired to put the vehicle in motion. Electric motor 24 receives current from any suitable source such as the storage battery 78, part of the standard equipment of the car. From this source 78 current flows through circuit 79 to one pole of the car ignition switch 80. From the other pole of switch 80 the circuit continues through connection 81 to one pole of the switch 82 which is operated by the trip stud 53. From the opposite pole of switch 82 the circuit continues through connection 83 to one pole of switch 84 operated by the clutch lever 6 through finger 77, shaft 76, arm 75, notched bar 74 and switch arm 72, said switch arm normally being in the position to complete the circuit through switch 84. The other pole of switch 84 is connected to one pole of switch 86 through connection 85. Switch 86 is controlled by the movement of lever 16. The opposite pole of switch 86 is connected to the electric motor 24 through connection 87. From the motor 24 the circuit is completed to the negative pole of battery 78 by any suitable means, such as the grounds to the car frame shown at 88.

When the operator of the vehicle desires to apply the parking brake, foot brake lever 8 is fully depressed, which motion is transmitted to the tooth member 66 which member, riding on the stud 68, is lifted, thus freeing rack 64 and allowing it to rotate when the lever 16 is dropped. This motion of the foot brake lever 8 is also transmitted through connection 58 to safety rod 56 drawing it off of the member 55 thereby allowing free rotation of the shaft 50 when the trip stud 53 is depressed. The operator, still holding the foot brake lever 8 in depressed position, then depresses the trip stud 53. This motion passing through arm 51 rotates shaft 50 and arm 48, thereby drawing rod 41 forward. This movement of rod 41 is transmitted to bracket 40 and latch 33 through spring 43 and lock nut 44. Latch 33 is rotated forward against the tension of springs 36, notches 31 disengage studs 30 and the lever 16 falls applying the brake. This same motion of rod 41 also operates to rotate safety latch 45 by transmission through connection 47', rod 41, and connection 46, this latch releasing its retention of the pivot 27 at the same instant notches 31 disengage studs 30, the latch 45 being designed to act in place of latch 33 should the latter fail to function. It is to be particularly noted that according to the present invention the emergency or parking brake cannot be applied until the foot brake lever 8 is completely depressed. This safety device insures that the brake will at no time be applied until the vehicle is completely at rest, thereby avoiding sudden stops and consequent accident. It is also to be noted that the rack 64, tooth member 66 and foot brake lever 8 connecting through rod 63 to bell crank lever 61 act as an auxiliary means to hold the lever 16 in the raised position should latch 33 become inoperative. Further note is to be had to the fact that when the trip stud 53 is depressed switch 82 is opened, opening the circuit from the source of electric current 78 to the electric motor 24, thereby rendering the motor 24 inoperative so that under no possible condition could it operate to maintain the lever 16 in the raised position and the brake in the position of release. As soon as lever 16 falls the operator may allow the foot brake pedal 8 and the trip stud 53 to return to their normal positions by removing the pressure applied to them, thus closing switch 82 and allowing toothed member 66 to reengage the rack 64. The fall of lever 16 acting through rod 63, spring 69, and rod 71 opens the switch 84, the switch arm 72 riding over the notches in the notched bar 74. The action of switch arm 72 riding over the notches in the notched bar 74 is made possible by the construction of the entire switch assembly. The arm 75 rotates about a fixed point, the shaft 76. The notched bar 74 rotatably engages arm 75 and has its opposite end restrained, as by the bracket 90, to allow a sliding movement therein plus a slight displacement at right angles to the direction of slide. The arm 75 rotating about its shaft by this construction raises and lowers the notched bar 74 with reference to the switch arm 72. When clutch lever 6 is in its normal position arm 75 is in position to raise the notched bar 74 to its maximum elevation with reference to the switch arm 72 and to disengage the notches of the bar and the end of the switch arm, allowing the switch arm 72 to move without interference. When the clutch lever is depressed the notched bar 74 is dropped as arm 75 rotates in a clockwise direction and is by this means allowed to engage the switch arm 72 on return of the clutch lever to its normal position. The downward motion of lever 16 also acts to close switch 86 which is open when the lever 16 is in the raised position.

When the vehicle is at rest with the brake applied and the ignition system turned off the circuit from source of electric current 78 to electric motor 24 is broken in two places, namely at the ignition switch 80 and the switch 84 activated by the clutch lever 6. The operator enters the vehicle to drive off. He must first close the ignition switch 80 to start the engine. This leaves the electric circuit before mentioned open at one point only, namely at switch 84. The vehicle engine is started and the operator depresses clutch lever 6 preparatory to putting the vehicle in gear. This depression working through the finger 77, rod 76 and arm 75 slides the notched bar 74 over the switch arm 72. As the clutch lever 6 is allowed to return slowly to put the vehicle in motion a notch on the notched bar 74 engages the switch arm 72 and against the tension of spring 69 moves that member to the rear and into position to close the switch 84 and complete the circuit between source of electric supply 78 and electric motor 24. This completion of the circuit occurs at a predetermined time interval before the clutch is completely engaged so that the brake may be off when the vehicle commences to move. As soon as switch 84 is closed the armature 25 of electric motor 24 commences to rotate. This movement is transferred through arm 26 and connecting link 28 to the lever 16 which commences to rise, the springs 36 meanwhile holding latch 33 against lugs 30. When these lugs 30 arrive at a point opposite the notches 31 the latch 33 is swung to the rear by the springs 36. At the same instant the upward motion of lever 16 opens switch 86, shutting off the current to electric motor 24 and further upward movement of lever 16 ceases. The brake is then in the brake released position. Simultaneous with the releasing of the brake the clutch engages completely and the vehicle moves off without jerk or vibration. Thus it will be seen that this brake may be used not only for the usual parking service but also when the vehicle must be temporarily stopped on an incline to insure a smooth start up the incline without any drift to the rear and consequent danger of collision with the vehicles that may be behind.

Switch 86 also plays an important part as a safety device. When the vehicle is in motion and the brake released, the electric circuit from source of power 78 to electric motor 24 is broken at one point only, namely, at switch 86. Now suppose that by some chance latch 33, safety latch 45 and rack assembly 64 all become inoperative at the same time. The lever 16 will start to fall but before the brake is applied the circuit will be closed at switch 86, and the electric motor 24 will raise lever 16 until switch 86 is opened when the process will occur again. The noise of motor 24 persistently lifting lever 16 will attract the operator's attention and lead to discovery of the defect in the mechanism as well as insure that the brake will not be suddenly and violently applied when the vehicle is in motion.

Chain 89 provides a manual means for lifting the lever 16 to the position of brake released should the provided automatic means fail.

From the foregoing it will be seen that there is provided by the invention an automatically operated power device for applying the parking or emergency brake which device, however, cannot be operated without first depressing the foot brake pedal and then depressing the trip stud; that the brake may be thus applied whether the engine be running or not but only when the vehicle is at rest or is in process of being brought to rest by means of pressure on the foot brake pedal; that the brake may be released by applying power to a separate electric motor, it being necessary, however, before initiating the release of the brake to depress the clutch and allow it to start to return to its normal position; and that all of the operations are under the control of the clutch lever, the foot brake lever, and the trip stud, thereby entirely eliminating the emergency brake lever heretofore in common use.

It will be readily understood by those skilled in the art that the inventive idea is not limited to the illustrative embodiment thereof shown and described in detail herein, since various modifications may be effected without departing from the broad inventive idea. For instance it is not essential to the inventive idea that the braking means be applied to the drive shaft of the automotive vehicle, it being quite obvious that the invention is applicable to the usual and standard two wheel or four wheel braking systems. The scope of the invention is therefore not to be limited to the specific embodiment herein shown and described, or otherwise than by the terms of the appended claims.

What is claimed is:—

1. In a braking mechanism for automobiles or the like, a brake, a weighted lever operatively connected thereto, means for raising said weighted lever and releasing said brake, an electric circuit controlling said raising means, an ignition circuit for the automobile, and common means for closing said controlling circuit and said ignition circuit.

2. In a braking mechanism for automobiles or the like, a brake, a weighted lever operatively connected thereto, means for raising said weighted lever and releasing said brake, an electric circuit controlling said raising means, a clutch lever, and means operatively connected to said clutch lever for closing said circuit.

3. In a braking mechanism for automobiles or the like, a brake, a weighted lever operatively connected thereto, means for raising said weighted lever and releasing said brake, an electric circuit controlling said raising means, a clutch lever, and means associated with said clutch lever for closing said circuit on return of said clutch lever to clutch engaged position.

4. In a braking mechanism for vehicles, a brake, a weighted lever operatively connected thereto, means for raising said weighted lever and releasing said brake, an electric circuit controlling said raising means, means for releasing said weighted lever from raised position, and means operatively connected to said releasing means of said weighted lever for opening said circuit on application of said releasing means.

5. In a braking mechanism for vehicles, a brake, a weighted lever operatively connected thereto, means for raising said weighted lever and releasing said brake, an electric circuit controlling said raising means, means for releasing said weighted lever, and means operatively connected to said releasing means of said weighted lever for opening said circuit on application of said releasing means and for closing said circuit when said releasing means is returned to normal position.

6. In a braking mechanism for vehicles, a brake, a weighted lever operatively connected thereto, means for raising said weighted lever and releasing said brake, an electric circuit controlling said raising means, means operatively connected to said weighted lever for opening and closing said circuit when said weighted lever is in the raised and in the released position, respectively.

7. In a braking mechanism for automobiles or the like, a brake, a weighted lever operatively connected thereto, means for raising said weighted lever and releasing said brake, an electric circuit controlling said raising means, means controlled by said weighted lever for opening and closing said circuit, means for releasing said weighted lever from raised position, means associated with said releasing means of said weighted lever for opening and closing said circuit, additional means for opening and closing said circuit, means operatively connecting said weighted lever and said additional means for opening said circuit when said weighted lever is released, a clutch lever and means operatively connecting said clutch lever and said additional means for closing said circuit on return of said clutch to clutch engaged position.

8. In a braking mechanism for automobiles or the like, a brake, a weighted lever operatively connected thereto, means for raising said weighted lever and releasing said brake, an electric circuit controlling said raising means, a clutch lever, means operated by release of said weighted lever to open said circuit, and means operated by said clutch lever to close said circuit when said clutch lever is returning to the clutch engaged position.

EDGAR D. BROWN.